Oct. 6, 1931.  J. LEDWINKA  1,826,426
PRESSED METAL VEHICLE BODY
Filed Jan. 8, 1927  3 Sheets-Sheet 1
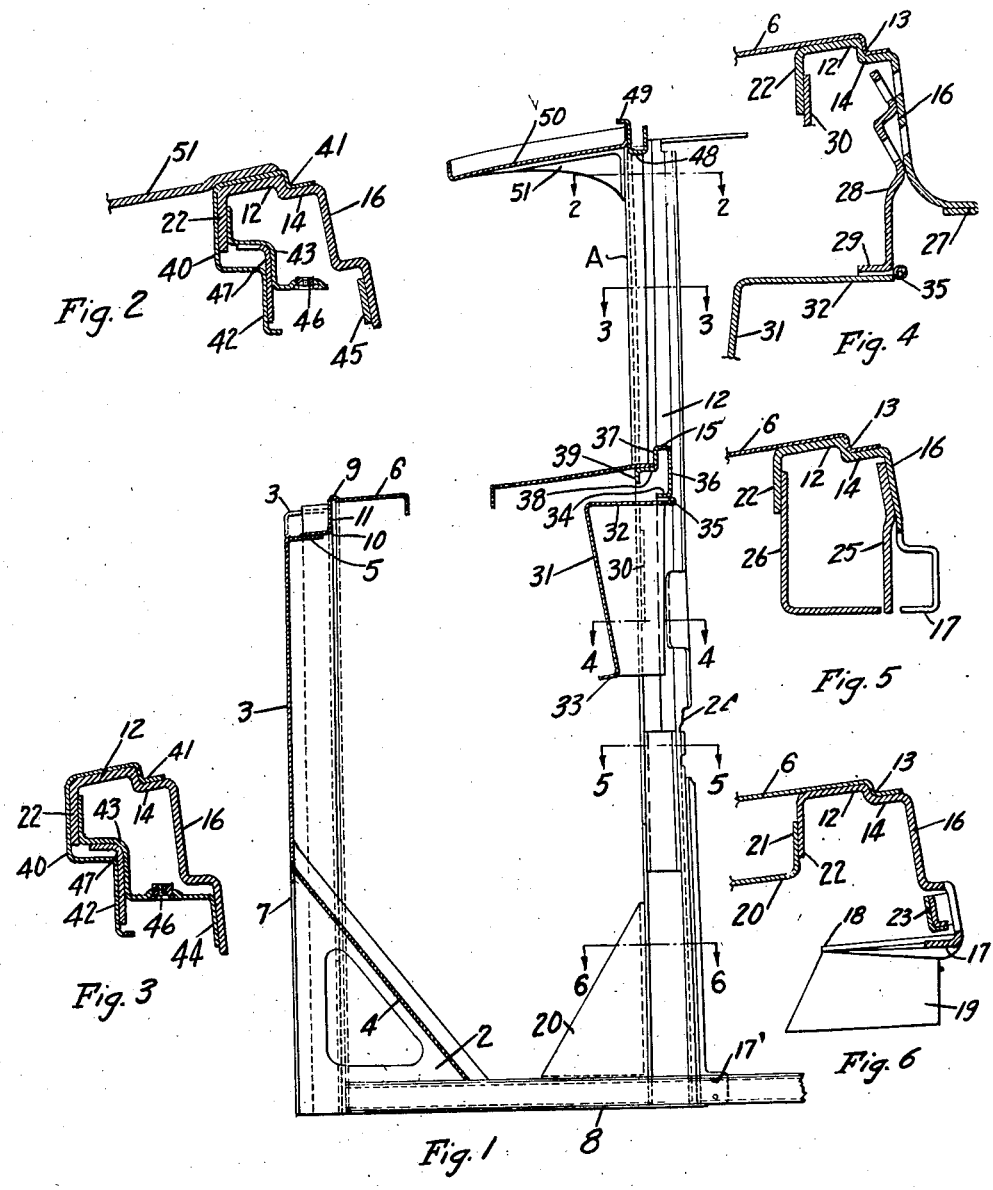
INVENTOR.
JOSEPH LEDWINKA
BY John P. Tarbox
ATTORNEY.

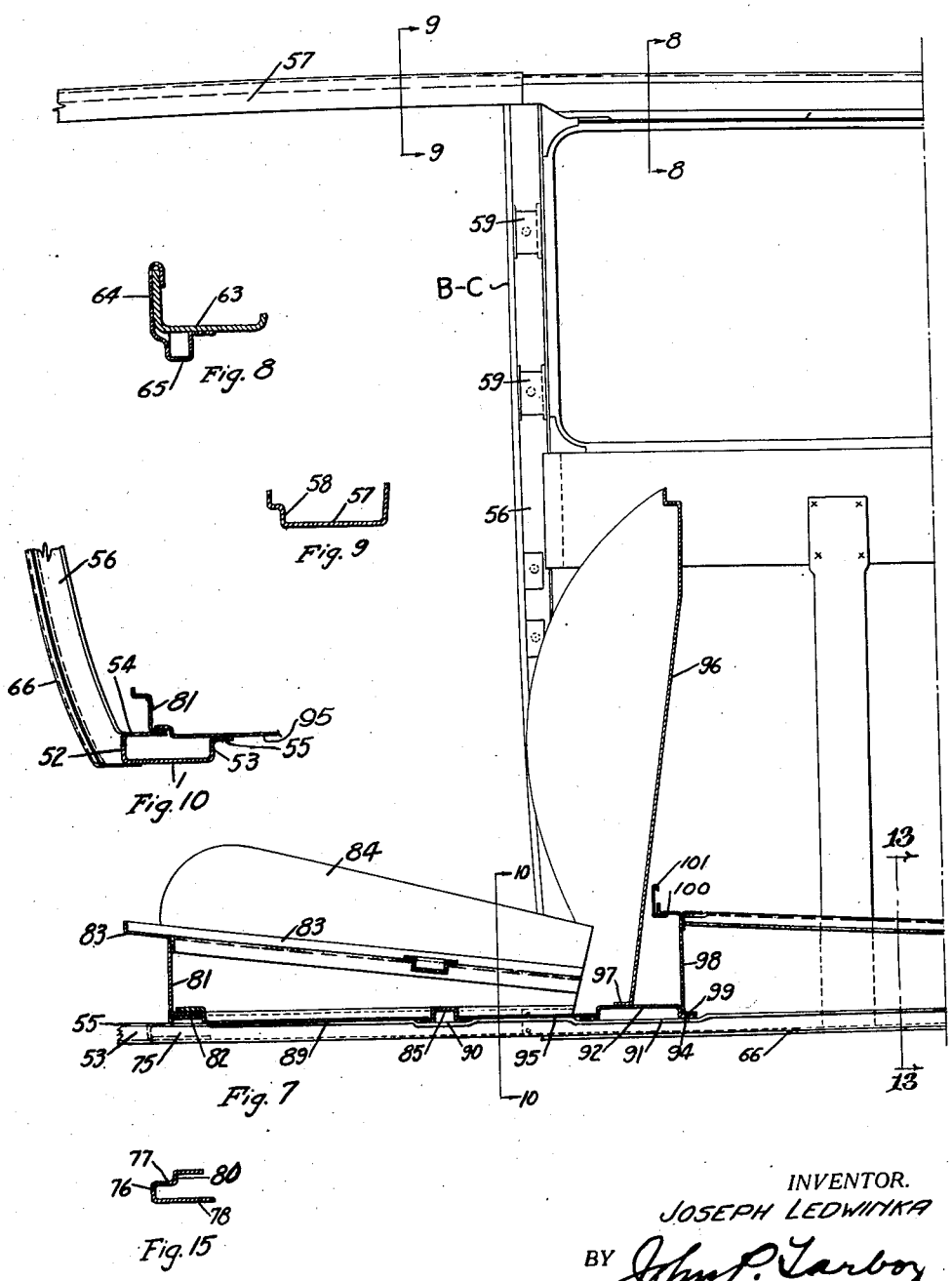

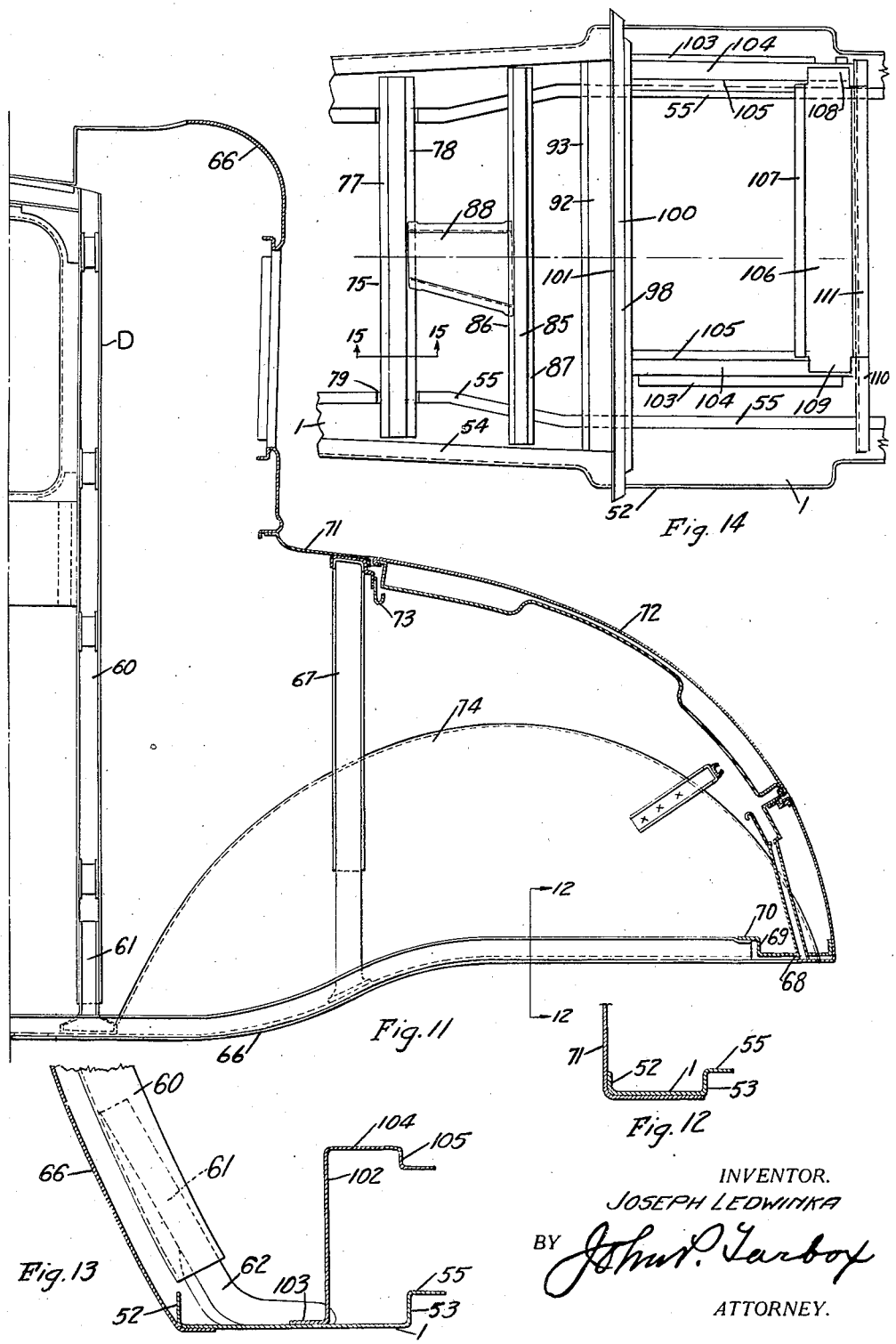

Patented Oct. 6, 1931

1,826,426

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL VEHICLE BODY

Application filed January 8, 1927. Serial No. 159,825.

This invention relates to a pressed metal automobile body construction.

The objective of automobile body manufacturers is to design the body so that the structural elements thereof may be readily formed by die stamping operations; will coact and interfit with each other so as to enable them to be readily assembled and secured together, preferably by welding; will be reduced in number to a minimum; and will possess a maximum strength for a minimum cross section and weight.

The object of this invention is to accomplish to a full measure the aims above enumerated, and in addition thereto, such other objects as will become apparent upon the completion of the description and claims hereinafter set forth.

In the accompanying drawings, the invention is shown as embodied in an automobile body of the coupé type, although it is to be clearly understood that the novel features thereof are capable of use upon other types of open or closed bodies.

The views of the drawings are as follows:

Figure 1 is a central vertical section through the cowl and post A of the body, showing the cowl, shroud, instrument board, lower and upper windshield headers, and visor in section, and the toe board support, side sill and A post in side elevation, looking from the inside of the body.

Fig. 2 is a horizontal section taken on line 2—2 of Fig. 1.

Fig. 3 is a horizontal section on line 3—3 of Fig. 1.

Fig. 4 is a horizontal section taken on line 4—4 of Fig. 1.

Fig. 5 is a horizontal section taken on line 5—5 of Fig. 1.

Fig. 6 is a horizontal section taken on line 6—6 of Fig. 1.

Fig. 7 is a section through the body at the B—C post, showing the seat supports in section and the sill, post and header in elevation.

Fig. 8 is a section through the rear sill roof header taken on line 8—8 of Fig. 7.

Fig. 9 is a section through the front side roof header taken on line 9—9 of Fig. 7.

Fig. 10 is a section through the seat support and sill taken on line 10—10 of Fig. 7.

Fig. 11 is a section through the rear of the body and the rear deck, the seat structure being omitted.

Fig. 12 is a section on line 12—12 of Fig. 11.

Fig. 13 is a section on line 13—13 of Fig. 7.

Fig. 14 is a top plan view of the sills, cross braces and seat support, and

Fig. 15 is a section on line 15—15 of Fig. 14.

In the following description the same reference numerals will refer to like parts throughout.

In referring to the vertical posts of the body construction, the one located at the rear of the cowl will be designated the A post, the one at the rear of the door opening the B—C post, and the one at the rear of the quarter window the D post. Also certain portions of the body construction will be referred to in general terms and illustrated somewhat diagrammatically in the drawings. The nature of such portions being generally understood.

That portion of the sill 1 shown in Fig. 1 is an upwardly presenting channel member the inner arm of which is inwardly flanged. The details of this sill will be more fully described hereinafter in connection with sectional views thereof taken on other figures of the drawings.

A toe board support 2 has its lower edge flanged and arranged in the channel of the sill, being secured to the base thereof. The forward vertical edge of the support is inwardly flanged so as to bear against the shroud 3 and be secured thereto. The other edge of the toe board support is flanged or otherwise formed into substantially Z shape, the lower arm 4 of which forms the support proper for the toe boards.

The shroud 3 is rearwardly flanged at 5 along its top and side edges so as to telescope within and be secured to the cowl 6. The shroud is rearwardly and downwardly flanged at 7, this flange extending transversely thereof and aligning with the arm 4 of the toe board support.

The cowl 6 is inwardly flanged at 8 along its bottom edges, such flanges being secured to the under side of sills 1. Adjacent the forward edge of the cowl a strengthening bead 9 is provided, while this edge is forwardly flanged at 10. The beading 9 also forms an abutment for the hood and the flange 10 a cooperating member for attaching the flange 5 of the shroud. The cowl and shroud are downwardly offset at 11 to form a depression in the middle of the top edge thereof. The rear vertical edges of the cowl lie against the outside of the outer wall 12 of the A posts and are inwardly and rearwardly flanged at 13 so as to nest within an inward offset portion 14 of the outer wall of the posts. The rear horizontal edge of the cowl rests upon and is secured to a forwardly flanged portion of the lower windshield header 15.

The A posts are inwardly facing channel members, the outer wall 12 of which is substantially the same throughout its full extent. As previously set forth, this outer wall is provided with an inward offset portion 14 receiving the rear vertical edges of the cowl. The lower ends of the posts rest upon the sills 1 and have the rear arms 16 thereof provided with a tab 17' secured to the outer wall of the sill, while above this tab the arm 16 is extended inwardly and flanged forwardly at 17. A bracing member 18 is secured to the flange 17 and has an inwardly extending flange 19 secured to the inwardly extending flange of the sill. A substantially triangular bracing member 20 has a flange 21 along one edge secured to the forward arm 22 of the post and a flange along the base edge thereof secured to the inwardly extending flange of the sill. The rearward wall 16 of the post is cut away and bent inwardly of the post at 23 to form a retainer for a door buffing element, such inwardly bent portion being reinforced by a separate element. The post A at the point where the section of Fig. 5 is taken has the forwardly extending flange 17 cut away and the rear arm recessed at 24 to accommodate one of the parts of a dovetail. A member 25, having one end secured interiorly of the rear arm 16 and being offset forwardly intermediate its ends, serves as an attaching and bracing member for the rear arm at this point. An angle member 26 has one end secured interiorly of the forward wall of the post and the other end, which is on the rearwardly projecting arm of the angle, united with the end of the members 25. In this way a box girder construction is provided at a position on the post where the most strain is imposed. The post at the point where the latch keeper is positioned is shown in Fig. 4, this view being a section taken on line 4—4 of Fig. 1. The rearward arm 16 is forwardly bent and has its inner end rearwardly curved and then bent backwardly upon itself as shown at 27 in Fig. 4. A backing and bracing member 28 for the latch keeper is secured to the inner side of the arm 16 of the post and has a forwardly extending arm 29 at the inner end thereof. A triangular bracing member 30 is secured to the inside of the front arm 22 of the post and extends upwardly and inwardly to reinforce the cowl and lower windshield header in a manner not shown.

An instrument board 31 has its side and top edges rearwardly flanged at 32 and its bottom edge forwardly flanged at 33. The main portion of this substantially Z shaped (in cross section) member is rearwardly and inwardly inclined, and the rearwardly extended flanges 32 along the side edges are secured to the forwardly extending flange 29 of the backing and bracing member 28. The rearwardly extending flange 32 along the top edge is secured to the under side of a forwardly extending flange 34 of the lower windshield header 15. A wind break or weatherstripping 35 seals the joints between the ends of the flanges 32 and the flanges 29 and 34.

The lower windshield header 15 comprises a substantially downwardly presenting channel member extending between and secured to the A posts and having its rear wall 36 of greater length than the front wall 37. The rear wall has the forwardly extending flange 34 at its lower end and the front wall the forwardly extending flange 38 and downwardly extending flange 39. As previously mentioned, the rear horizontal edge of the cowl is secured to the upper side of the flange 38 and abuts the wall 37. It will thus be seen that a good weather tight joint is formed and a rabbet for the windshield is provided which will effectually preclude the admission of moisture or air.

It will also be noted that the longitudinally extending elements of the top of the cowl panel, where it seats on the flange 38, are substantially rectilinear from the front to the rear edge of the cowl so that the top of the cowl panel may be said to sweep rearwardly on substantially rectilinear lines from its front to its rear edge.

The post A above the cowl has an outer finish molding 40 secured to the forward and outer arms of the post, the end 41 of which is flanged to nest in the offset portion 14 thereof, in the same manner as the ends of the cowl panel are secured to the post. The other end of the finish molding 40 is flanged so as to form a substantially Z shape portion 42 which provides a side ledge for the windshield. A double Z shaped member 43 has one arm secured to the inside of the forward arm 22 of the post and the arm adjacent the other end thereof extending rearwardly toward the rear arm 16 of the post where it is flanged inwardly at 44 and secured thereto. It should be observed, however, that the flange 44 does not occur, at the point where the sectional view depicted in Fig. 2 is taken, the same being omitted for the passage of the securing bracket 45 which joins the A post to the longitudinal header. The member 43 is provided with tapped bosses 46 into which are threaded the retaining screws for the inner finish molding (not shown). An angle member 47 secured to the member 43 is interposed between the latter and the portion 42 of the molding which is secured thereto.

An upper windshield header 48 is arranged between the posts and comprises an upwardly presenting channel member, the forward wall of which is forwardly flanged at 49. The ends of the header fit within the posts, the forward wall thereof being welded or otherwise secured to the forward arm of the posts and the rear wall thereof having an angle member secured thereto and to the longitudinal header.

A visor 50 comprises an arcuate stamping having an upwardly extending flange along its front and rear edges, the flange at the rear being secured to the front wall of the header. A bracket member 51 is secured to the post and to the under side of the visor, thus effectively supporting the same.

The sill 1 from the A post to the B—C post has both its outer arm 52 and its inner arm 53 inwardly flanged at 54 and 55, respectively. The arms are substantially the same height along this portion of the sill as indicated in Fig. 10. The sill to the rear of the B—C post takes the configuration shown in Fig. 13, the flange 54 of the outer arm 52 being absent.

The B—C posts 56 have their lower ends connected to the sills in the usual manner, while their upper ends are connected to the longitudinal headers 57. These headers are upwardly presenting channel members, the outer arm 58 thereof being outwardly offset. Bracing members 59 are arranged in the posts, which are inwardly facing channels, at spaced intervals, these bracing members also serving as attaching means for an inner finishing strip.

The D posts 60 are inwardly facing channels extending from the sills to the rear end of the headers over the quarter windows. An inwardly facing channel member 61 serves to attach the posts to the sills, this member nesting within and secured to the posts at its upper end and having its lower end turned inwardly to form a foot or attaching portion 62. This portion consists of the base wall of the member 61, turned inwardly, and the side walls thereof turned backwardly, as is apparent in Figs. 11 and 13.

An upwardly presenting channel member 63 extends from the B—C post to the D post and constitutes a header above the quarter window. Paneling 64 has one edge flanged around the upper edge of the outer arm of the header 63 and a downwardly offset beading 65 adjacent the other end which is secured to the under side of the header. The beading 65 forms an outer retaining molding for the quarter window. The manner in which the body paneling 66 is secured to the frame members of the body is well known and will not be described in detail.

The sill to the rear of the B—C post takes the form shown in Fig. 13, and between the D post and the rear deck support 67 is upwardly deflected to provide for the axle clearance. An upwardly presenting channel member 68 extends across the body at the rear of the deck and provides a rear sill. The forward arm 69 of the rear sill is forwardly flanged at 70, which flange is secured to the side sills 1. The rear deck paneling 71 is flanged inwardly and secured to the under side of the side and rear sills, as clearly shown in Figs. 11 and 12. The rear deck lid 72, drip trough 73, and wheel housing 74 are of usual construction and will not be described in detail.

Between the sills, at a point beneath the front edge of the forward seat, a cross brace 75 extends and comprises a rearwardly facing channel having a forward wall 76, a top wall 77, and a bottom wall 78. This brace is secured to the sill by having its opposite ends extend through cut outs 79 formed in the inner arm 53 and flange 55 of the sill so that the bottom wall 78 rests upon and is secured to the base of the sill 1. The upper wall 77 of the cross brace is upwardly deflected at 80, thus forming the forward portion of this wall into a rabbeted support for the floor boards. A vertical heel board and seat support 81 for the forward seat extends transversely and rearwardly of the body and has an inwardly extending flange 82 resting upon and secured to the rear upper portion of the upper wall 77 and the flange 54 of the sill. The upper edge of the heel board is outwardly and upwardly flanged at 83 to form a support and retainer for the forward seat 84. The member 81 is diminishing in height toward the rear.

A downwardly presenting flanged channel member 85 extends between the sills beneath the forward seat, the flanges 86 and 87 thereof being secured to the inner flange of the sills with each end projecting across the channel thereof. This member forms a second cross brace and also supports in part an upwardly presenting channeled member 88, the forward end of which is secured to the bottom wall 78 of the brace 75 and the flanges of the rear end of which are secured to the under side of the flange 86 of cross brace 85.

A lower seat pan 89 has its front end upwardly and forwardly flanged to rest upon and be secured to the flange 82 of the heel board and seat support 81, its side edges secured to the inner flange of the sill and the adjacent flange of the member 88, and its rear edge to the flange 86 of cross brace 85.

Depressions 90 and 91 are formed in the inner flange of the sills for the reception, respectively, of cross braces 85 and 92. The cross brace 92 is a downwardly presenting flanged channel member extending between the sills to the rear of the B—C posts. This member has its flanges 93 and 94 secured to the inner flanges of the sills, while the ends project outwardly across the sills substantially to the outer flanges of the sills.

A lower seat pan 95 is secured to the rear flange 87 of the cross brace 85, to the inner flange of the sill, to the flange 93 of the cross brace 92, and to the flange 82 of the seat support 81, which extends rearwardly along its inner side resting upon the member 88 and lying across the brace 85. A curved seat back 96 is provided for the forward seat and has its lower edge forwardly flanged at 97 and secured to the upper surface of the cross brace 92.

A vertical transversely extending heel board and seat support 98 for the rearward seat has its lower end rearwardly flanged at 99 and resting upon and secured to the flange 94 of the cross brace 92. The upper end of the heelboard is forwardly and upwardly inclined at 100 and has a member 101 attached thereto by a rearwardly extending flange secured beneath the flange 100. The top of this member which acts as a seat retainer is bent to form a beading. The heel board 98 extends at each end outwardly of the outer arm of the sills, which from this point rearwardly do not have the flange 54 but take the form shown in Fig. 13. A seat riser or support 102 is arranged in and secured to the sill on one side of the body and extends rearwardly from the heelboard to the D post. On the other side of the body the riser is positioned inwardly of the adjacent body side sill and is supported by a cross brace and an elevated transversely extending member 106. This riser or support comprises the main vertical portion gradually diminishing in height rearwardly to give the proper slope or cant to the seat, a lower flange portion 103, and an upper flange portion 104. The flange 103 projects outwardly and is secured to the bottom arm of the sill while the flange 104 extends inwardly and has its inner end downwardly offset at 105 so that it will form a continuation of the flange 100. The riser or support 102 which is connected at its forward end to the cross brace 92 is connected at its rear end to the downwardly presenting channel member 106. This member is arranged above the level of the sills, thus it will be seen that the rear end of the seat risers while lower than the forward ends thereof are still above the level of the sills. The forward flange 107 of the member 106 is cut away adjacent each end where it is secured to the inner flange of the risers. The top wall of the member 106 is extended at 108 and 109 and secured to the top wall 104 of the risers. At the rear of the member 106 a rearwardly facing channel member 110 extends transversely between the sills and has its lower flange secured to the inner flange thereof, while its upper flange receives and has secured upon it the rear flange 111 of the member 106.

As clearly appears from the foregoing description and the sectional side elevation shown in Figure 7 and the plan view shown in Figure 14 of the drawings, the front and rear seat structures are arranged for the most part on opposite sides of a longitudinal vertical plane of the body somewhat to the left of the central longitudinal vertical plane indicated by the dot and dash lines of Figure 14. That this will have to be so is evident from Figure 7, which shows the front heel board of the rear seat substantially in transverse alignment with the front seat back. The seats are thus arranged in transversely and longitudinally offset relation.

The foregoing description is thought to have fully brought out the characteristics of the construction and to have indicated the novel arrangement and formation of the elements thereof.

In view of the fact that the invention is susceptible of various modifications and adaptations, the following claims are submitted with the understanding that their scope is the only limitation upon the number of such modifications and adaptations.

What I claim as new and useful and desire to protect by Letters Patent is:—

1. In a pressed metal automobile body construction, an inwardly facing channel member forming a door post at the rear of the cowl, the inner wall of said post being formed to receive a door centering means and having a strengthening and securing member secured interiorly thereof, and an angle member having one arm secured to the forward wall of the post and its other arm extending across the post to the said strengthening and securing member, whereby a substantially box girder construction is formed.

2. In a pressed metal automobile body construction, an inwardly facing channel member forming a door post at the rear of the cowl, the rear wall of said post being recessed and adapted to receive a latch keeper in said recess, a strengthening and securing member secured to the inner side of said rear wall at said recess, and an instrument board secured to said member.

3. In a pressed metal automobile body construction, an inwardly facing channel member forming a door post at the rear of the cowl, the rear wall of said post being recessed to receive a latch keeper and rearwardly curved at the recess with its edge forwardly flanged upon itself, a strengthening and securing member secured to the inner side of said rear wall and having a free end forwardly flanged, and an instrument board secured to the flange of said securing member.

4. In a pressed metal automobile body construction, an inwardly facing channel member forming a door post at the rear of the cowl, a flanged strengthening and bracing member having a flange secured to the forward and rearward walls, respectively, of the post, an outer post paneling secured to the outer and forward walls of the post, and a member secured to said strengthening member and the free end of the outer post paneling.

5. In a pressed metal automobile body construction, an inwardly facing channel member forming a door post at the rear of the cowl, a substantially double Z shaped bracing and strengthening member having opposite ends secured to the forward and rearward walls, respectively, of the post, an outer post paneling, and an angle member interposed between said bracing member and the paneling and having one of its arms secured to both the paneling and the bracing member.

6. In a pressed metal automobile body construction, an inwardly facing channel member forming a door post at the rear of the cowl, a substantially double Z shaped bracing and strengthing member secured to the forward wall of the post, an outer post paneling, an angle member interposed between said bracing member and the paneling and having one of its arms secured to both the bracing member and paneling, and a bracket adapted to support the visor secured to the outside of the post exteriorly of the paneling.

7. In a pressed metal automobile body construction, body side sills and spaced cross braces therebetween, a supporting member secured to said cross braces intermediate the side sills, and a combined heel board and seat support secured to one of said sills, one of said cross braces, and said supporting member.

8. In a pressed metal automobile body construction, body side sills and longitudinally extending seat risers, said risers comprising an angle having an end of one arm outwardly flanged and the inner end of the other arm downwardly offset, one of said seat risers having its outer flange secured to one of the sills and the other of said risers being supported inwardly of the body from the other sill by separate members.

9. In a pressed metal automobile body construction, body side sills, a cross brace extending between said sills, a transverse member secured to one of the sills and extending toward the other, and longitudinally extending seat risers between the cross brace and the transverse member, one of said seat risers being secured to and supported by one of the sills and the other of said risers being secured to said cross brace and transverse member inwardly of the body from the other of said sills.

10. In a vehicle body construction, an inwardly facing channel form front post having the forward side wall thereof above the belt line of less width than the rear side wall, a panel strip covering the bottom and front side walls of the post and formed beyond said front side wall with a rabbeted edge portion to receive the edge of a windshield, and means secured to a wall of said channel and supporting the rabbeted edge portion of said panel strip.

11. In a vehicle body having seats arranged in transversely and longitudinally offset relation, side sills, and a cross member comprising a downwardly presenting flanged channel stamping connecting said sills and providing a common support for the rear portion of the forward seat structure and for the forward portion of the rear seat structure, portions of said seat structures being seated within the angles formed by the flanges and the adjacent side walls of the channel.

In testimony whereof I hereunto affix my signature.

JOSEPH LEDWINKA.